Figure 6:
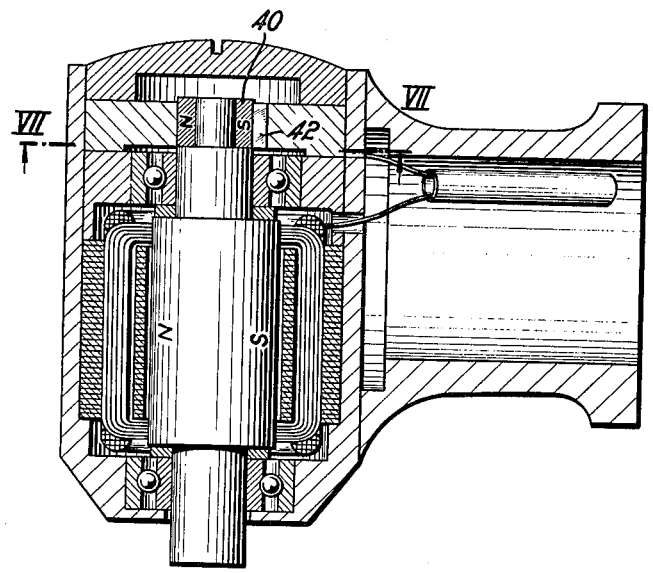

Aug. 31, 1965     O. KREUTZER     3,204,165
SELF-COMMUTATING DIRECT CURRENT ELECTRIC MOTOR
Filed Dec. 14, 1961                                       3 Sheets-Sheet 1
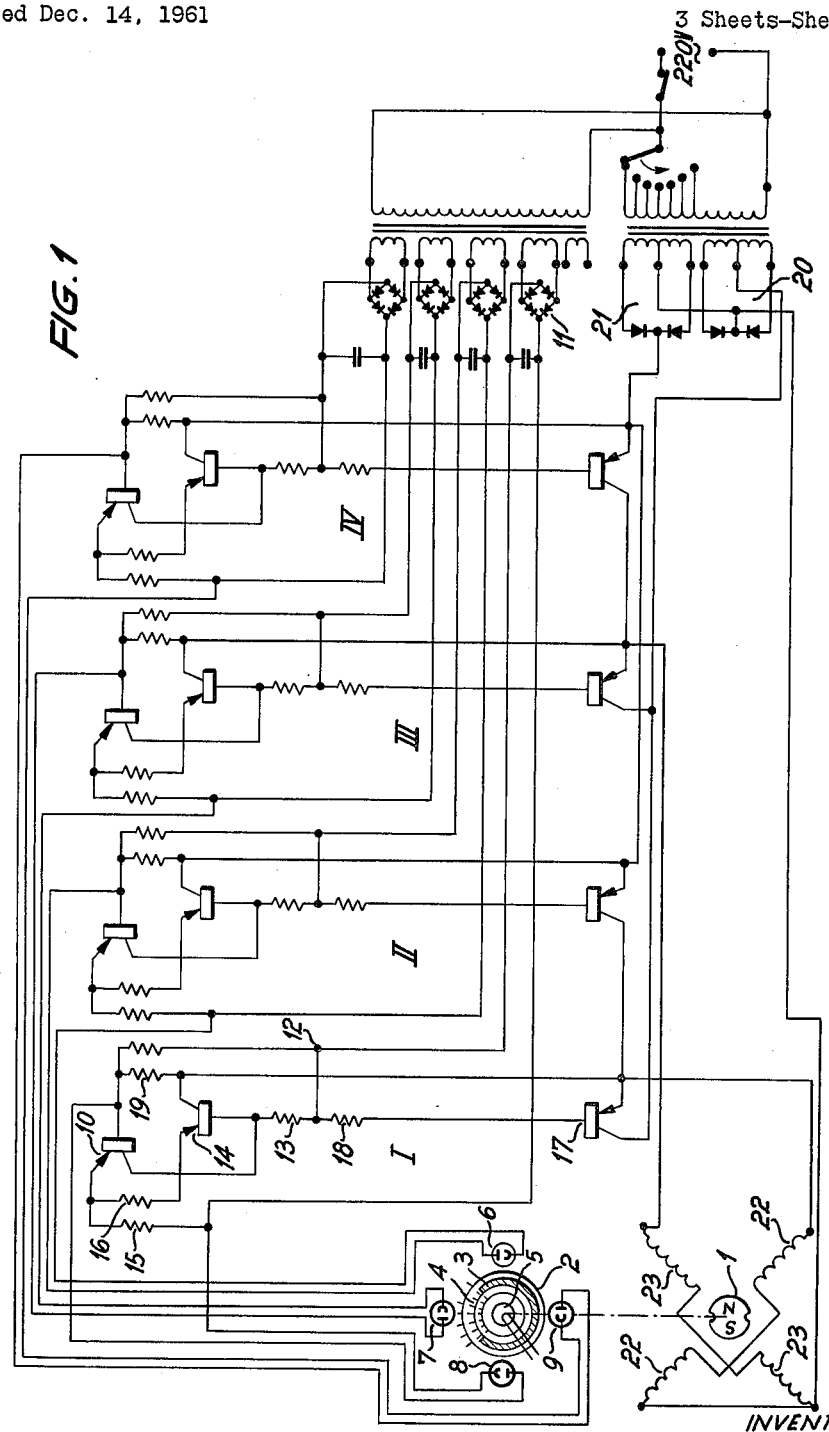
INVENTOR
Otto Kreutzer
By Watson, Cole, Grindle & Watson
ATTORNEYS Aug. 31, 1965  O. KREUTZER  3,204,165
SELF-COMMUTATING DIRECT CURRENT ELECTRIC MOTOR
Filed Dec. 14, 1961  3 Sheets-Sheet 2
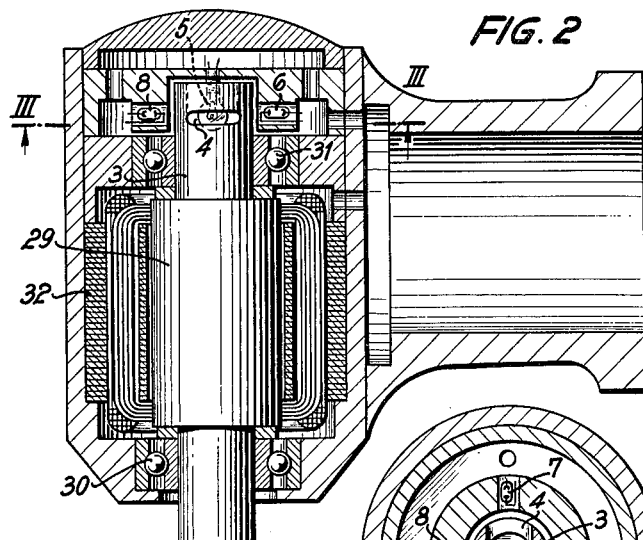
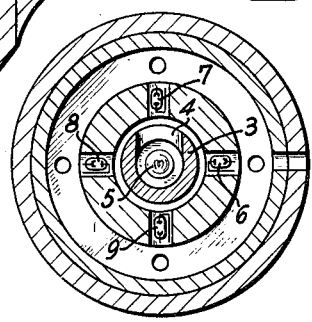
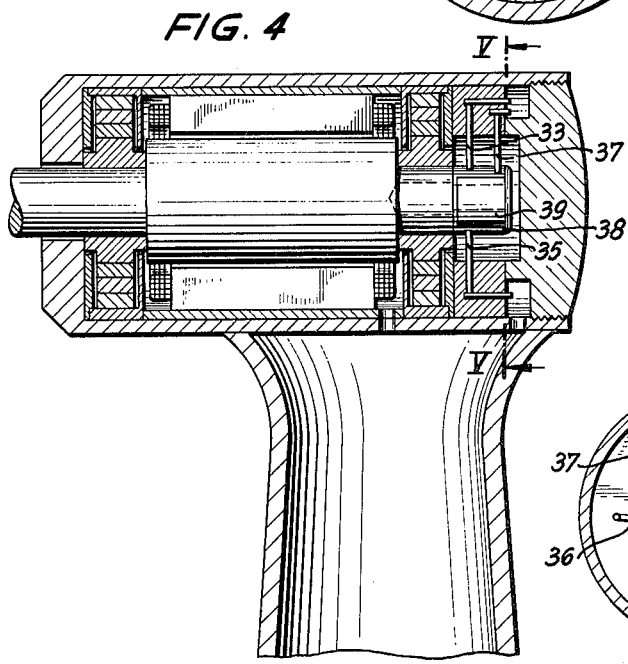
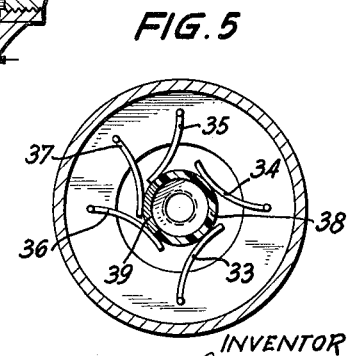
INVENTOR
Otto Kreutzer
By Watson, Cole, Grindle & Watson
ATTORNEYS Aug. 31, 1965    O. KREUTZER    3,204,165
SELF-COMMUTATING DIRECT CURRENT ELECTRIC MOTOR
Filed Dec. 14, 1961    3 Sheets-Sheet 3

INVENTOR
Otto Kreutzer

By Watson, Cole, Grindle & Watson
ATTORNEYS

United States Patent Office 3,204,165
Patented Aug. 31, 1965

3,204,165
SELF-COMMUTATING DIRECT CURRENT
ELECTRIC MOTOR
Otto Kreutzer, Constance, Germany, assignor to Airotor Vertriebsgesellschaft m.b.H., Constance, Germany, a German company
Filed Dec. 14, 1961, Ser. No. 159,210
Claims priority, application Germany, Dec. 21, 1960,
A 36,343
9 Claims. (Cl. 318—138)

The invention relates to a self-commutating direct current motor and is concerned with a motor upon the stator of which there are an even number of stator coils.

These motors have a disadvantage that, although their speed is variable, it has not hitherto been possible to obtain very high speeds therewith. They have a further disadvantage that the sparking which occurs at the commutator at relatively high speeds destroys the commutator segments and thus limits their useful life. Moreover, at high speeds of, for example, 15,000 to 20,000 r.p.m., the known brush sparking is accompanied by flashing, which results in very rapid erosion of the commutator.

Efforts have already been made to obviate brush sparking at the commutators of direct-current electric motors and generators by employing instead of a commutator carrying the full winding current a commutation arrangement operating at lower power levels which arrangement is used to control, through a valve amplifier, means for passing excitation current through the stator coils of the machine. The commutating arrangement employed for this purpose has been an arrangement using Hall generators.

Such arrangements, however, are unsatisfactory if it is desired to reach high speeds, more especially speeds of several hundred thousand r.p.m., in direct-current electric motors, as is frequently desirable in the art, because valve amplifiers are fundamentally unsuitable for the operation of motors, owing to the fact that the high internal resistance of valves impairs the efficiency of operation and above all makes it difficult to obtain the necessary high starting currents. These disadvantages cannot be overcome by merely replacing valve amplifiers by transistors, because the transistors would burn out at such high switching speeds. Where transistors have hitherto been employed in electric motors, this has been done only to control motors for electric clocks which are separately controlled and use low power and run at a low speed of revolution.

According to the present invention there is provided a self-commutating direct-current motor comprising a rotor, a stator having an even number of coils thereon which are connected in pairs to form windings, at least one transistor connected to each winding for passing energizing current through that winding, a number of transistor amplifier circuits having two possible states connected to a respective one of the transistors for ensuring that each transistor is conductive when the transistor amplifier circuit connected thereto is in one state and is non-conductive when the transistor amplifier circuit is in the other state, first means fixed with respect to the stator and connected to said transistor amplifier circuits and second means mounted on the rotor for co-operation with said first means to cause the latter to make said transistor amplifier circuits change in succession from one state to the other and back to said one state at a rate dependent upon the speed of the rotor, said transistor amplifier circuits each comprising feed-back means for ensuring that in each transistor amplifier circuit a change from one state to the other will take place rapidly.

Each of said transistor amplifier circuits preferably comprises two pre-amplifying transistors in a feed-back circuit connected to respective power transistor which is rendered conductive or non-conductive in dependence of the state of the feed-back circuit. To enable each stator winding to be energized in opposite directions two power transistors and respective feed-back circuits are associated with each stator winding, one power transistor, when conductive, energizing the winding in one direction and the other power transistor, when conductive, energizing the winding in the opposite direction. Furthermore, one power transistor may be connected to the positive pole say of a first direct energizing current source and the other power transistor then connected to the negative pole of a second direct energizing current source. The other poles of the sources are connected together and to one end of the stator winding. The power transistors are rendered conductive alternately to provide current first in one direction then in the other through the winding.

The commutation arrangement may use Hall generators or a photo-electric control system. In an embodiment of the latter case, there are disposed symmetrically around the shaft of the rotor of the motor photo-diodes which are successively exposed to light passing through an aperture in a sleeve mounted on the rotor or reflected from a reflector mounted on the rotor. Because the control currents in the commutation arrangement are small, the control may also be effected through a commutation arrangement of the brush and contact type.

Figure 7:
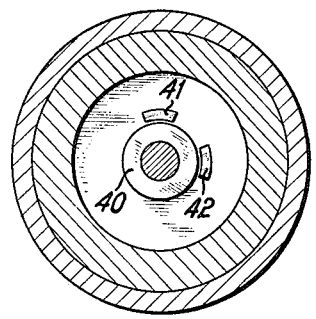

For a better understanding of the present invention and to show how the same may be carried into effect, reference will now be made to the accompanying drawings in which:

FIGURE 1 is a circuit diagram of a self-commutating direct-current motor according to the invention which uses photo-electric control, FIGURE 2 illustrates in longitudinal section the motor shown diagrammatically in FIGURE 1, FIGURE 3 is a cross-section along the plane III—III, through the motor shown in FIGURE 2, FIGURE 4 illustrates in longitudinal section an alternative embodiment of the motor using a brush and contact type commutation arrangement, FIGURE 5 shows in a simplified drawing a section through commutation arrangement the motor according to FIGURE 4, FIGURE 6 shows in a longitudinal section a further embodiment of the motor using Hall generators in the commutation arrangement, and FIGURE 7 is a cross-section through the motor shown in FIGURE 6 along the plane VII—VII.

Referring to FIGURE 1, the motor shown diagrammatically therein has a rotor 1 which is a permanent magnet SN. The stator of the motor has four coils thereon which are connected in pairs to form two stator windings 22 and 23. Mounted on one end of the shaft of the rotor 1 is a sleeve 3 with a slit 4 formed therein. A lamp 5 is stationarily mounted in the sleeve 3. Four photodiodes 6, 7, 8, 9 are so symmetrically disposed around the sleeves that the sleeve is interposed between them and the lamp and that they are successively exposed to the light from the lamp 5 through the slit 4 as the sleeve 3 rotates with the rotor. Each of the photo-diodes is coupled to a transistor set comprising two pre-amplfying transistors and a power transistor. These sets are designated I to IV and are connected to diodes 8, 6, 7 and 9 respectively. The operation of the circuit will be described with reference to set I, the other sets operating in a similar manner. The set I comprises two pre-amplifying transistors 10 and 14 connected to a power transistor 17. When photo-diode 8 is activated by light from the lamp 5 falling thereon as the sleeve 3 rotates it becomes conductive and the positive voltage generated in a rectifier arrangement 11 is applied through the photo-diode to the base of the transistor 10, so that the latter becomes non-conducting. The negative voltage of the rectifier arrangement 11 appears at the point 12 and is applied through the base resistor 13 to base of the transistor 14. Since the base of the transistor 14 is connected to the collector of the transistor 10, when the latter is cut-off the base voltage becomes more negative and transistor 14 becomes conductive. Consequently, a current flows from positive of supply 11 through a resistor 15, a resistor 16, the resistor 14, the base-emitter junction of the power transistor 17 and the base resistor 18 of the transistor 17 and back to the negative side of the direct-current source 11 through the point 12. The transistor 17 is hereby rendered conducting. At the same time, a current flows through the transistor 14 and its collector resistor 19, which provides feed-back and causes the transistor 10 to become rapidly non-conductive. By reason of this feed-back arrangement, a very rapid change of state of the transistors takes place. As soon as the power transistor 17 is rendered conducting, a current flows from a first direct-current source 20 through the stator winding 22 of the motor and through the transistor 17 back to the negative pole of the direct-current source 20. Consequently, the permanent magnet armature further rotates through about 90° in a given direction. In this further rotation, the light beam passing through the slit is directed on to the next photo-diode, for Example 7, which in turn correspondingly switches the transistor set III, the transistor set I being returned to its initial state as photo-diode 8 is no longer activated by light falling thereon. The power transistor of the transistor set III passes current through the stator winding 23, whilst the previously energized stator winding 22 is de-energized. Consequently, the rotor again rotates through 90°, whereby the photo-diode 6 is exposed to light. The transistor set II is thereby switched in. However, the power transistor of transistor set II is so connected to a second direct-current source 21, the negative pole of which is connected to the positive pole of the source 20, that a current now flows in the inverse direction through the stator winding 22. The rotor 1 is thus again further rotated through 90°, the light from the lamp is directed through the slit 4 on to the photo-diode 9 and the transistor set IV is thus switched in the manner already described with reference to the transistor set I, except that the power transistor of set IV is also connected to the direct-current source 21 and energizes the stator winding 23 in the opposite direction to that when the transistor set III operated, in a corresponding manner to the power transistor of the set II.

Owing to the use of twice as many transistor sets as there are stator windings in the motor, as described in the foregoing example, maximum electrical efficiency is obtained, since the current flows through the stator windings in two directions and these windings are thus fully utilised, and consequently the motor can be designed for maximum output for given dimensions.

FIGURES 2 and 3 show an embodiment of the motor shown diagrammatically in FIGURE 1 wherein the commutation is photo-electrically effected as in FIGURE 1. The armature 29, which carries a permanent magnet, is freely mounted in the ball bearings 30 and 31, and has in its upper end a cylindrical cavity to receive the lamp 5. As the armature rotates, the photo-diodes 6, 7, 8 and 9 are successively exposed to light through the slit 4 in the sleeve 3. Instead of the stator laminations 32, it is desirable to employ for particularly high speeds either a ferrite core or low-loss laminations. The photo-diodes and the stator windings are connected to the transistor sets and the current sources in the manner described with reference to FIGURE 1. The structural form of the motor and of its housing as illustrated in FIGURE 2 is suitable, for example, for driving the drill of a dental handpiece.

FIGURES 4 and 5 show an alternative embodiment of the motor shown in FIGURES 2 and 3. In this case the motor uses a mechanically operating commutator arrangement of the brush and contact type. The commutator has a rotating slip ring 38 on which the brush 37 constantly slides. Extending from the slip ring 38 in the direction of the armature shaft and in connection therewith is a conductive segment 39 which occupies approximately one quarter of the total circumference of the commutator, while the other three-quarters of the circumference of the commutator are of insulating material. Four brushes 33, 34, 35 and 36 arranged symmetrically around the commutator slide on the part of the latter which includes the segment 39. The brush 37 is connected to the positive poles of the direct-current sources 11, while the brushes 33–36 are each extended to the base of one of the transistors 10 of the four sets, in the manner illustrated in FIGURE 1 in the case of the photo-electric diodes. When one of these brushes 33 to 36 encounters the conductive segment 39 during the rotation of the armature, the connection to the positive pole of the current source 11 is established, whereby the transistor 10 associated with the set concerned is rendered non-conducting, and the switching sequence takes place in the same way as is indicated in FIGURE 1. Since only very small control currents need to be passed through the brushes and commutators, substantially no sparking occurs even at the highest speeds of rotation.

Finally, FIGURES 6 and 7 illustrate a further embodiment of the motor in which Hall generators are utilised for controlling the transistor sets. In this constructional form, there is mounted on the armature shaft a very small magnet wheel 40, of which the magnetic field acts on two Hall generators 41 and 42 and controls them in accordance with the position of the magnet wheel. In this arrangement also, it is possible in principle with an appropriate adaption to the transistor amplifier, to employ the same circuit arrangement and the same stator winding arrangement as described with reference to FIGURE 1. This constructional form has, like the photo-electric control arrangement, the advantage that all sparking can be eliminated due to the omission of mechanically operating contacts.

Various modifications may be made to the examples now described. Thus, for example, for low speeds of rotation, the armature may consists of a coil through which direct current is passed, instead of a permanent magnet. With the photo-electric control arrangements there may be mounted on the armature shaft, a reflector inclined at 45° in relation to the said shaft and successively reflecting the light from a lamp mounted in line with the axis of the armature shaft on to the photo-electric cells. Also, the stator could have four, six or even more windings and the commutator arrangement and the transistor amplifier could accordingly have two, three or more times as many elements as in the constructional example illustrated in FIGURE 1.

Practice has in fact shown that very high speeds can be obtained by self-commutating direct-current machines as hereinbefore described. The speed is determined substantially by the magnitude of the applied power and by the applied voltage. An advantage of the circuit arrangement described is that the transistor-controlled motor is self-starting.

I claim:

1. A self-commutating direct current motor comprising a rotor, a stator having at least two windings thereon, respective power transistors connected to the windings for passing energizing current therethrough, respective independent preamplifier transistor switching sets connected to the power transistors for ensuring that each power transistor is conductive when the transistor switching set connected thereto is in a first conductive state and is non-conductive when that transistor switching set is in a second conductive state, and commutating means operable by movement of said rotor to produce low energy signals which vary cyclically as the rotor turns and connected to apply said signals to said transistor switching sets in sequence whereby they are changed each in its turn from one of said states to the other and each in its turn back to said one state, the changes occurring at a frequency dependent upon the speed of the rotor, said transistor switching sets each comprising two transistors with feedback means from one to the other for ensuring that in each transistor switching set each of the changes from one state to the other will take place rapidly.

2. The combination defined in claim 1 having twice as many of said power transistors as windings, respectively coupled to opposite ends of the windings.

3. The combination defined in claim 1 wherein the commutating means produces upon movement of said rotor low energy positive signals intermixed with signals of first state which signals vary cyclically as the rotor turns, a first transistor of said sets residing in a conductive state when the commutating means provides signals in its first state and corresponding a second transistor of the set and the power transistor in non-conductive states, whereby the positive signals connected to said transistor switching sets cause the state of first transistor to change and thereby render the second and power transistors connected thereto conductive, and each transistor switching set returning to said condition of the termination of the positive signals from said commutating means.

4. A motor according to claim 3 and further comprising additional power transistors and switching sets similar to the first power transistors and transistor switching sets specified in claim 3 and connected to said commutating means and said windings for passing through the windings currents in directions opposite to the directions of the currents passed by said first power transistors.

5. A motor according to claim 4 with said power transistors having emitter and collector electrodes in combination with a first two pole source of direct energizing current having one pole connected to the collectors of said first power transistors, a second source of two pole direct energizing current having its pole which is of the same polarity as said one pole connected to the other pole of said first source and having its other pole connected to the emitters of said additional power transistors, and a connection between the other pole of said first source and each of said windings of the stator.

6. A motor according to claim 1, wherein the commutating means comprises a brush assembly and a contact assembly mounted respectively on the rotor and stator.

7. A motor according to claim 1 wherein the commutating means comprises respective photo-electric devices coupled to the transistor switching sets, and means including an associated light source interrupted by rotation of said rotor to permit light to pass to only one photo-electric device at a time and changing from one to the next at a rate depending upon the speed of said rotor.

8. A motor according to claim 1 wherein the commutating means comprises respective Hall generators connected to the transistor switching sets and excited each in turn by a permanent magnet mounted on said rotor to bring about said changes.

9. A motor according to claim 1 wherein each of said windings comprises two series connected coils on opposite sides of the stator.

References Cited by the Examiner
UNITED STATES PATENTS

| | | | |
|---|---|---|---|
| 2,512,325 | 6/50 | Hansen | 310—72.1 |
| 3,025,443 | 3/62 | Wilkinson et al. | 318—138 |
| 3,096,467 | 7/63 | Angus | 318—138 |
| 3,124,732 | 3/64 | Dupy | 318—138 |
| 3,124,733 | 3/64 | Andrews | 318—138 |
| 3,140,434 | 7/64 | Hetzel | 318—138 |

ORIS L. RADER, *Primary Examiner.*